(12) United States Patent
Kulkarni et al.

(10) Patent No.: US 7,519,769 B1
(45) Date of Patent: Apr. 14, 2009

(54) SCALABLE STORAGE NETWORK VIRTUALIZATION

(75) Inventors: Mugdha Kulkarni, Nashua, NH (US); Ron Stern, Sharon, MA (US)

(73) Assignee: EMC Corporation, Hopkinton, MA (US)

(*) Notice: Subject to any disclaimer, the term of this patent is extended or adjusted under 35 U.S.C. 154(b) by 274 days.

(21) Appl. No.: 11/427,585

(22) Filed: Jun. 29, 2006

(51) Int. Cl.
*G06F 12/00* (2006.01)

(52) U.S. Cl. ...................................... 711/114

(58) Field of Classification Search ........................ None
See application file for complete search history.

(56) References Cited

U.S. PATENT DOCUMENTS

| 6,877,011 | B2 * | 4/2005 | Jaskiewicz | 707/102 |
| 6,925,528 | B2 * | 8/2005 | Selkirk et al. | 711/114 |
| 2003/0172149 | A1 * | 9/2003 | Edsall et al. | 709/224 |

OTHER PUBLICATIONS

Charles Millilgan et al., Online Storage Virtualization: The key to managing the data explosion, Proceedings of the 35th Hawaii International Conference on System Sciences, 2002, IEEE.

* cited by examiner

*Primary Examiner*—Hiep T Nguyen
(74) *Attorney, Agent, or Firm*—Guerin & Rodriguez, LLP; Michael A. Rodriguez

(57) ABSTRACT

Described are a storage system and method for providing networked access to a plurality of storage devices. The storage system includes a virtualization controller coupled to a network. The virtualization controller produces a mapping of a virtual target to one or more physical storage devices on the network. The storage system also includes an initiator in communication with the virtualization controller over to the network to receive the mapping from the virtualization controller. The initiator includes a virtualization client for translating, in accordance with the mapping, a target access request directed to the virtual target by the initiator into a target access request directed to one of the physical storage devices.

20 Claims, 12 Drawing Sheets

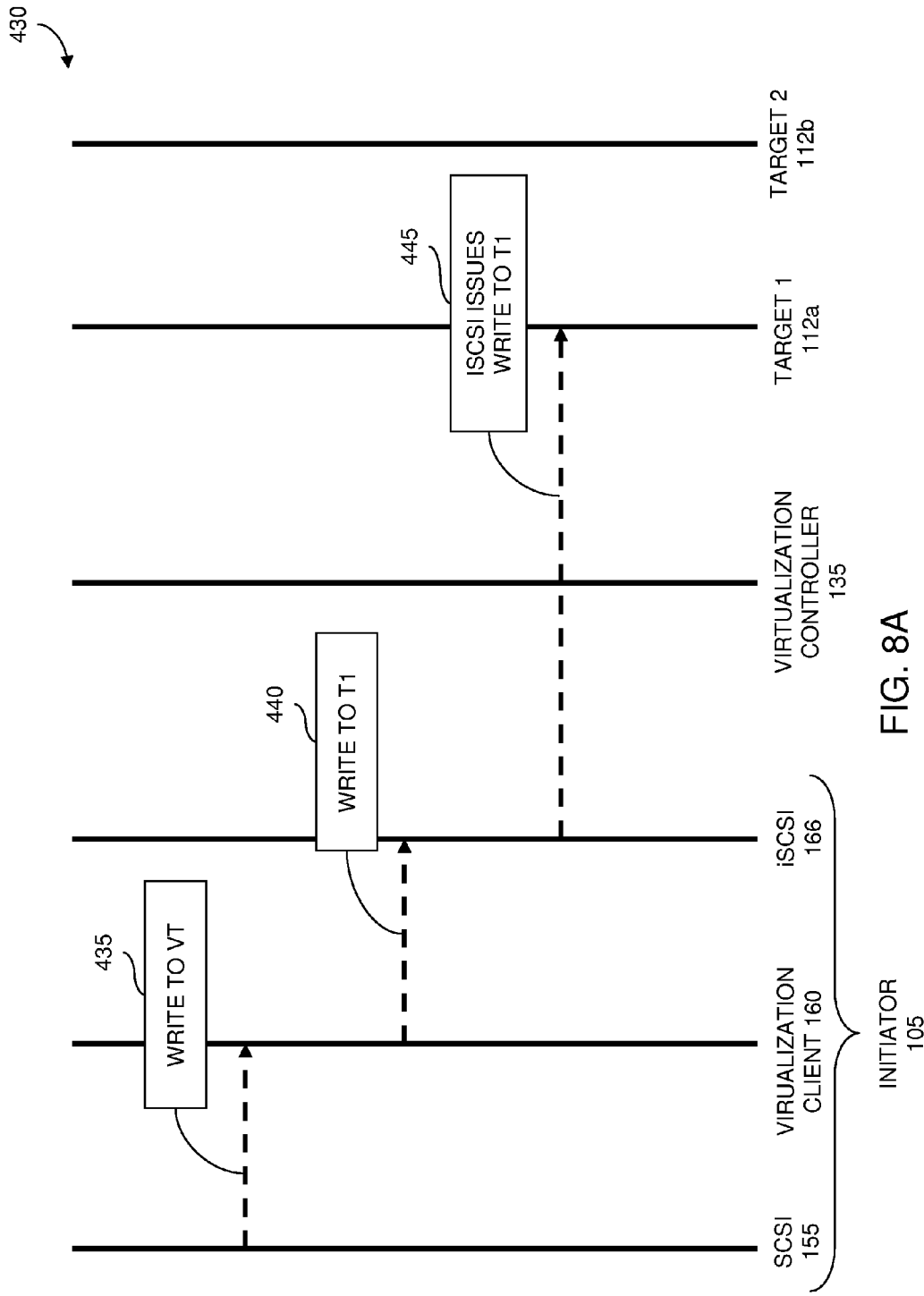

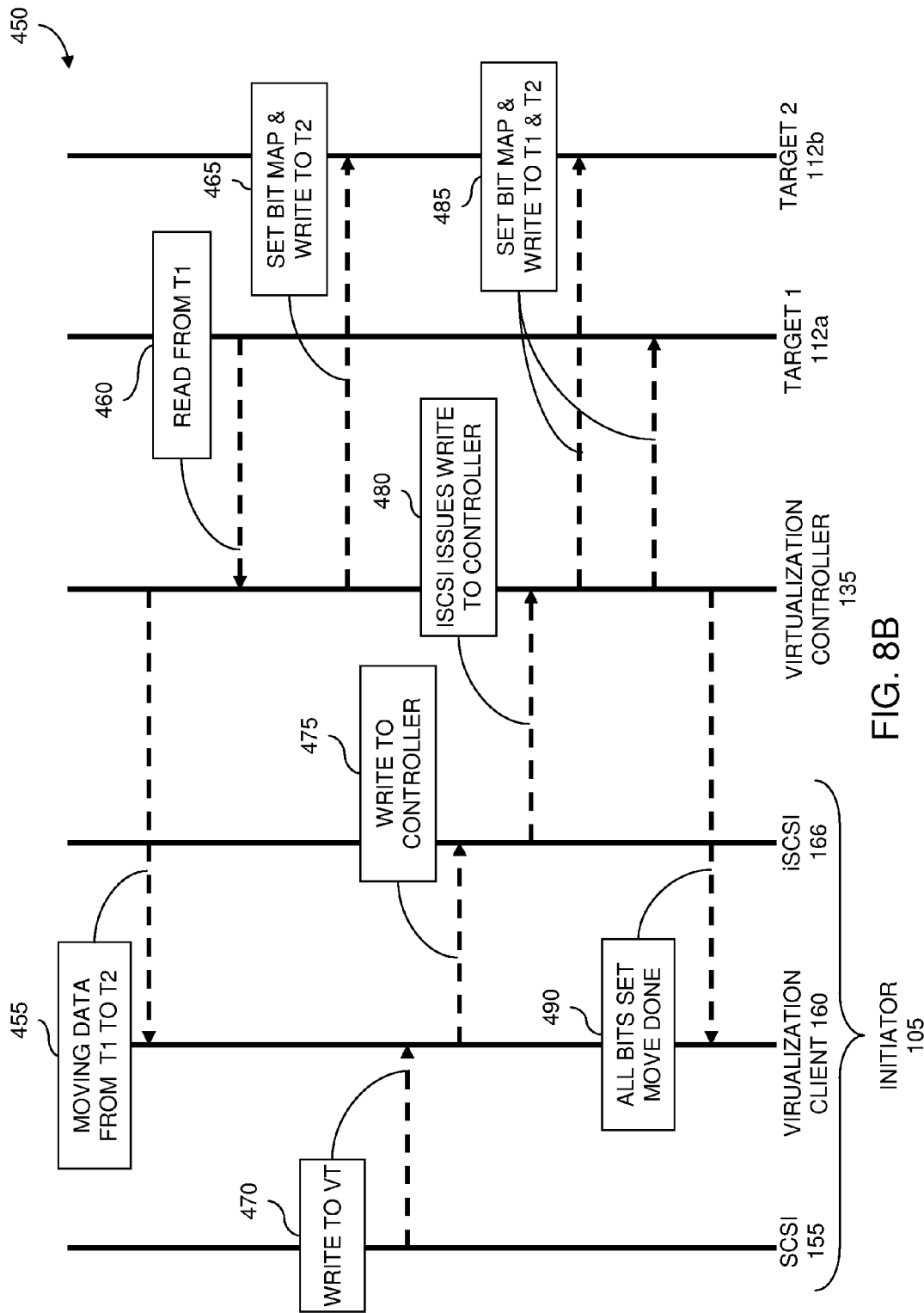

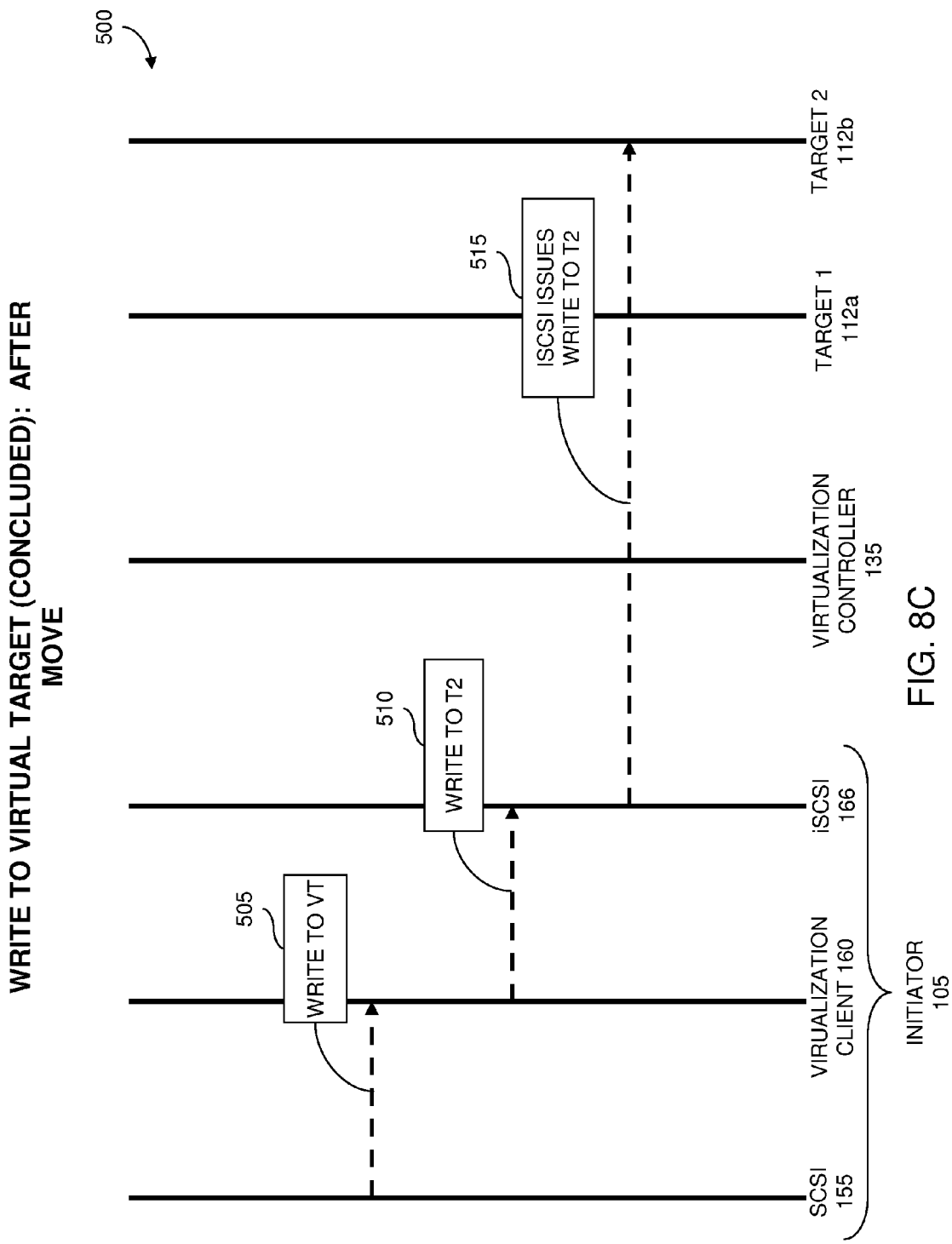

| Bit Byte | 7 | 6 | 5 | 4 | 3 | 2 | 1 | 0 |
|---|---|---|---|---|---|---|---|---|
| 0 | Peripheral qualifier | | | Peripheral device type | | | | |
| 1 | RMB | Reserved | | | | | | |
| 2 | ISO/IEC version | | ECMA version | | | ANSI version | | |
| 3 | AERC | TrmTsk | NormACA | Reserved | Response data format | | | |
| 4 | Additional length (n-4) | | | | | | | |
| 5 | Reserved | | | | | | | |
| 6 | Reserved | DocServ | VS | MultiP | MChngr | ACKREQQ† | Addr32† | Addr16† |
| 7 | RelAdr | WBus32† | WBus16† | Sync† | Linked | TranDis† | CmdQue | VS |
| 8 – 15 | (MSB) Vendor identification (LSB) | | | | | | | |
| 16 – 31 | (MSB) Product identification (LSB) | | | | | | | |
| 32 – 35 | (MSB) Product revision level (LSB) | | | | | | | |
| 36 – 55 | Vendor-specific | | | | | | | |
| 56 – 95 | Reserved | | | | | | | |
| | Vendor-specific parameters | | | | | | | |
| 96 – n | Vendor-specific | | | | | | | |

Note: † The meanings of these bits are specific to SIP (see 7.5.2). For protocols other than SIP, these bits are reserved.

FIG. 10

SCALABLE STORAGE NETWORK VIRTUALIZATION

FIELD OF THE INVENTION

The present invention relates generally to computer storage. More particularly, the present invention relates to scalable virtualization of storage networks.

BACKGROUND

Small Computer System Interface (SCSI) refers to a standard interface and command set for transferring data between devices on both internal and external computer buses. SCSI is commonly used for hard disks and tape storage devices, but can also be used to connect a wide range of other devices, including scanners, printers, CD-ROM drives, CD recorders, and DVD drives. More generally, the SCSI standard promotes device independence, suggesting that SCSI can be used with any type of computer hardware. Despite these advantages, SCSI's physical interface substantially restricts separation between SCSI connected devices due to a maximum allowable cable length.

A variation of SCSI, referred to as Internet SCSI (iSCSI), represents another standard protocol that enables the use of the SCSI protocol with unrestricted device separations using TCP/IP networks. The iSCSI protocol uses the SCSI command set and transmits SCSI commands over the Internet. Beneficially, the iSCSI protocol is a connection-oriented, point-to-point protocol that guarantees delivery order with a streaming interface. Thus, the TCP/IP encapsulation eliminates any distance limitations of the SCSI physical interface by allowing an iSCSI-capable initiator at one end of a network to access an iSCSI-capable target at another end of the network. In iSCSI storage applications, the servers are commonly referred to as initiators and the storage devices as targets.

Storage Area Networks (SANs) are designed to attach storage devices, such as disk array controllers and tape libraries, to hosts or servers running applications for accessing the stored data. Preferably, SANs provide some level of flexibility with several benefits, such as consolidating storage resources, providing storage-on-demand, increasing application availability, improving preparedness for disaster recovery, and increasing return on investment.

Additional benefits can be achieved through virtualization of the SAN. Generally, virtualization in a storage area network describes a software abstraction that separates a storage resource and its use from the underlying physical machine. Virtualization provides administrators with a powerful tool for configuring and distributing physical storage resources among multiple hosts. Internet Protocol (IP) networks generally were not designed with virtualization in mind. Consequently, virtualization has had limited penetration into iSCSI-based SANs. A current virtualization implementation for iSCSI introduces a virtualization appliance between iSCSI initiators and iSCSI targets. This virtualization appliance, however, becomes a bottleneck. Moreover, this implementation does not scale well: adding additional iSCSI initiators and iSCSI targets to the storage area network only exacerbates the bottleneck problem.

SUMMARY

In one aspect, the invention features a storage system providing networked access to a plurality of storage devices. The storage system includes a virtualization controller coupled to a network. The virtualization controller produces a mapping of a virtual target to one or more physical storage devices on the network. The storage system also includes an initiator in communication with the virtualization controller over to the network to receive the mapping from the virtualization controller. The initiator includes a virtualization client for translating, in accordance with the mapping, a target access request directed to the virtual target by the initiator into a target access request directed to one of the physical storage devices.

In another aspect, the invention features a method for accessing a plurality of target storage devices over a network. A virtualization controller discovers at least one initiator and a plurality of target storage devices coupled to the network. A virtual target is mapped to at least one of the discovered plurality of target storage devices. The virtualization client forwards the mapping over the network to at least one discovered initiator.

In still another aspect, the invention features a storage system providing networked access to a plurality of storage devices. The storage system includes means for discovering by a virtualization controller at least one iSCSI initiator and a plurality of iSCSI target storage devices coupled to an Internet Protocol (IP) network, means for mapping at the virtualization controller at least one of the plurality of iSCSI target storage devices to a virtual target; and means for forwarding the mapping to at least iSCSI initiator coupled to the network.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

FIG. 8A is a flow diagram illustrating one embodiment of a process for writing directly to a virtual target.

FIG. 8B is a flow diagram illustrating one embodiment of a process for writing to a virtual target during a move process.

FIG. 8C is a flow diagram illustrating another embodiment of a process for writing directly to a virtual target.

FIG. 10 is a representation of one embodiment of a standard-inquiry data format.

DETAILED DESCRIPTION

Storage networks constructed in accordance with the present invention include a server implementing a virtualization controller, host systems running virtualization clients, and a storage area network (SAN) coupled to an Internet Protocol (IP) network. The virtualization controller distributes mapping information to the virtualization clients. The mapping information maps virtual targets to physical storage devices.

Applications running on host devices (referred to as initiators) communicate with storage devices (referred to as targets) of the SAN. These applications issue target access requests to virtual targets. Virtualization client running on the initiators use the mapping to translate the target access requests directed to virtual targets into target access requests directed to physical storage targets.

The distributed virtualization of the storage resources achieved by the virtualization controller and virtualization clients separates the applications running on the initiators from the particular physical storage resources: the applications send commands to virtual targets. From the perspective of the host applications, the physical targets behind the virtual targets are unknown. Such virtualization provides a single point of management and offers scalability: through the virtualization controller, an administrator can add physical storage resources to the storage network by redefining existing virtual targets or producing new virtual targets to reflect the change in the physical storage resources. After receiving new mappings, the initiators are able to accommodate the physical storage resources because the initiators are able to communicate with the physical storage resources directly (such communications are not required to pass through the virtualization controller).

Although the invention is described herein primarily with reference to the iSCSI protocol and IP networks, it is to be understood that the principles of distributed virtualization, as described herein with respect to embodiments of the invention, can extend to the other storage protocols, for example, Fibre Channel.

Figure 1:
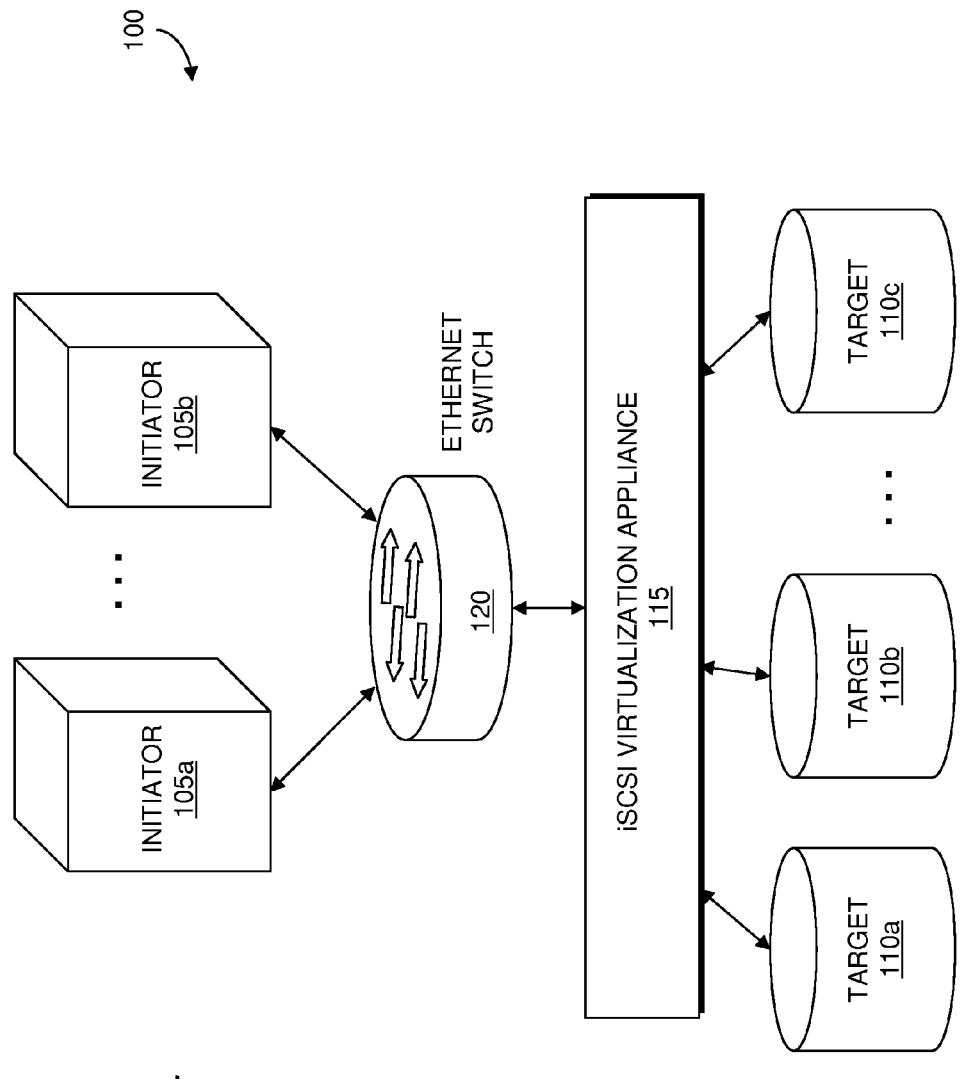
FIG. 1 illustrates functional block diagram of a prior art storage system including a network-accessible iSCSI virtualization appliance providing access therethrough to a plurality of target storage devices.

FIG. 1 illustrates a prior art storage system 100 providing access to storage devices across a network. One or more host computers or initiators 105a, 105b (generally 105) are coupled to an iSCSI virtualization appliance 115 through an Ethernet switch 120. The iSCSI virtualization appliance 115 is coupled to one or more target storage devices 110a, 110b, 110c (generally 110) providing storage capacity.

The iSCSI virtualization appliance 115 is a device having a network port coupled to the network 120. The iSCSI virtualization appliance 115 also has device ports coupled to the target storage devices 110. Thus, the target storage devices 110 are not coupled to the network 120 directly, but are only in communication with the network 120 through the iSCSI virtualization appliance 115. Consequently, all communications between the initiators 105 and any of the target storage devices 110 is necessarily routed through the iSCSI virtualization appliance 115. Such single-point routing is undesirable at least because it poses a bottleneck.

One such iSCSI virtualization appliance 115 is marketed under the name "WinTarget," commercially available from String Bean Software, Inc., of Montgomery Village, Md. Unfortunately, iSCSI virtualization appliances 115, such as WinTarget, add a layer within the middle of the network. The severity of the bottleneck is related to the capacity of the iSCSI virtualization appliance 115. For example, an appliance with more interfaces provides a greater service capacity. Nevertheless, any physical realization of such an appliance will pose a bottleneck at some level. Moreover, requiring that all communications to targets be routed through such an appliance also poses a severe restriction to scalability. For example, the number of device ports provided on the appliance can limit the number of accessible target storage devices 110.

Figure 2:
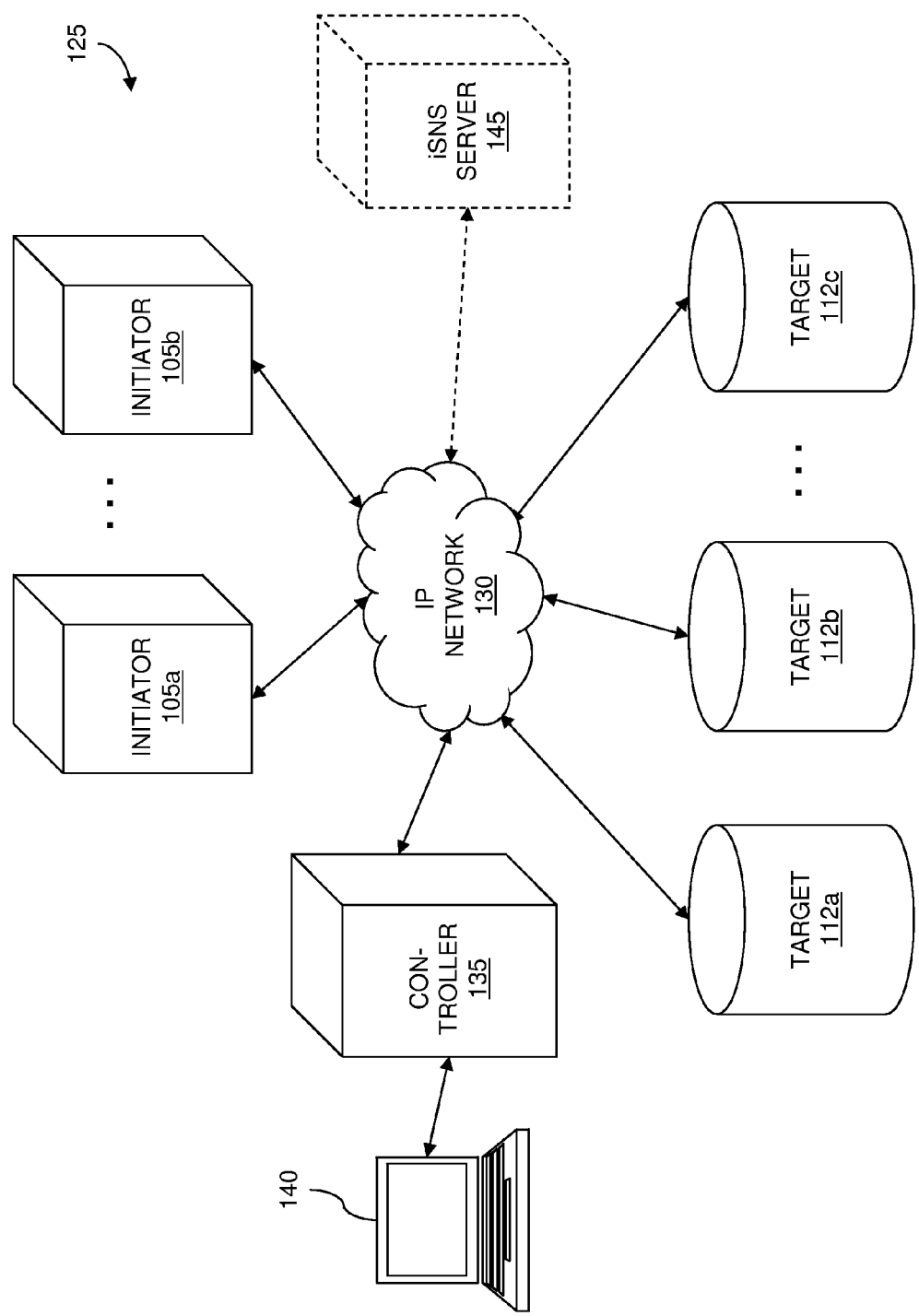
FIG. 2 illustrates functional block diagram of one embodiment of a storage system constructed in accordance with the principles of the invention providing initiators with direct-networked access to target storage devices.

FIG. 2 illustrates one embodiment of a SAN 125 constructed in accordance with the principles of the invention. The SAN 125 includes initiators 105a, 105b (generally 105) and target storage devices 112a, 112b, 112c (generally 112). Each initiator 105 and target 112 is coupled to an Internet Protocol (IP) network 130. Each of the target storage devices 112 is independently accessible by any of the initiators 105 through the IP network 130. One or more of the target storage devices 112 includes a storage array having a plurality of individually addressable physical storage elements (e.g., disk drives).

In one embodiment, the SAN is an iSCSI network, and the initiators 105 and targets 112 communicate in accordance with the iSCSI protocol.

The SAN 125 also includes a virtualization controller 135 coupled to the IP network 130. As described in more detail below, the virtualization controller 135 enables the initiators 105 to have direct-networked access to the target storage devices 112.

The virtualization controller 135 provides a configuration capability for establishing, maintaining, and re-configuring the SAN 125. For example, a user terminal 140 can be coupled to the virtualization controller 135, by which an administrator can monitor and reconfigure the SAN 125. The virtualization controller 135 serves as the "policy maker" for determining which target storage devices 112 are presented to the initiators 105 and the associations between virtual targets and physical targets.

Optionally, the SAN 125 can also include an iSNS (Internet Storage Name Service) server 145 (shown in phantom) with which the initiators 105 and targets 112 can register, as described below.

Figure 3:
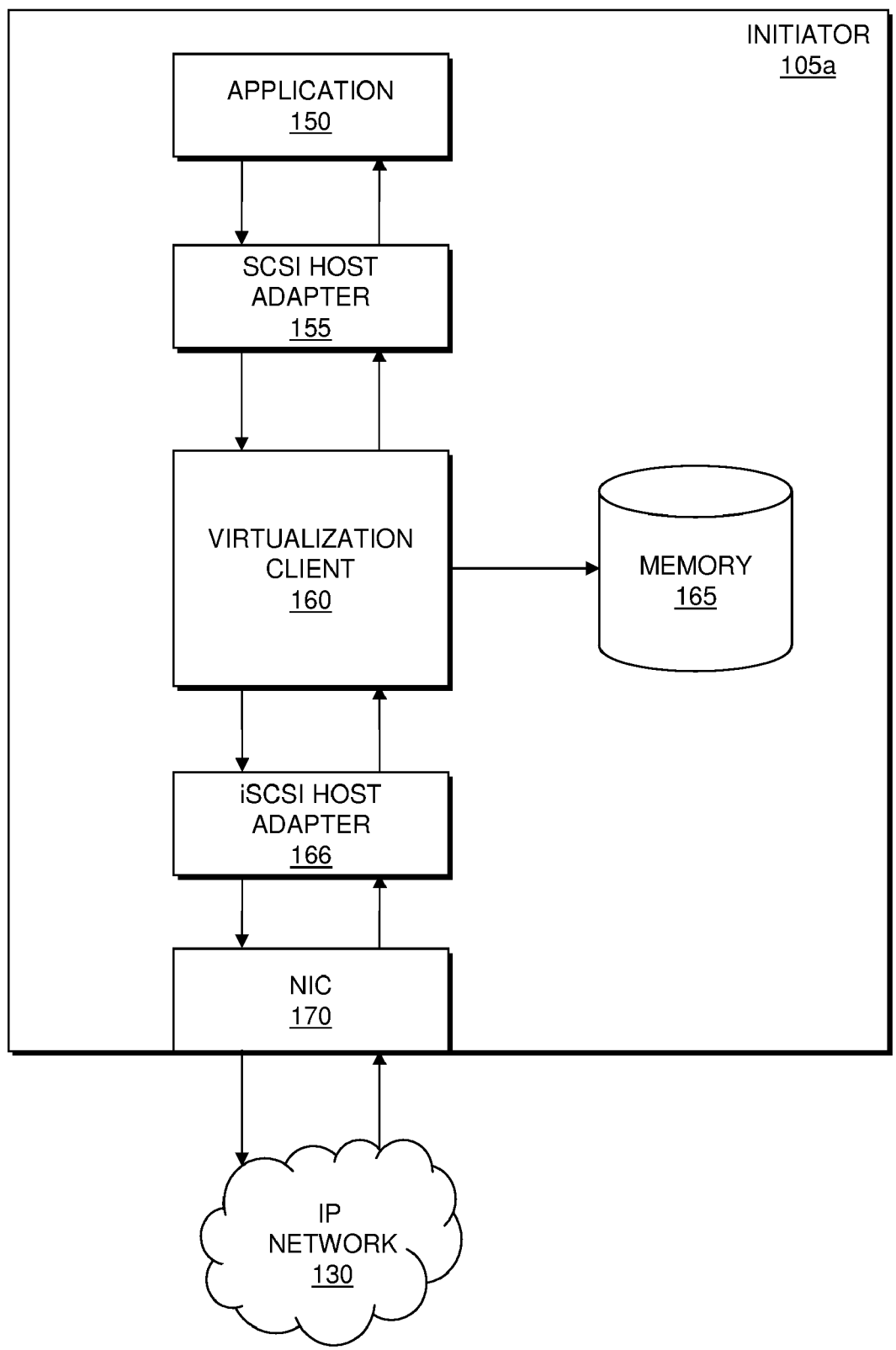
FIG. 3 is a more-detailed functional block diagram of one of the initiators of FIG. 2.

FIG. 3 shows an embodiment of one of the initiators 105a, as a representative example of the initiators 105. The initiator 105a can be a computer, such as a mainframe, or a smaller computer such as a workstation, a server, a portable computer, such as a laptop, and even a computer embedded on another device, such as a personal digital assistant, or mobile communications device. The initiator 105 includes an application 150 that operates under the control of an operating system, e.g., Microsoft WINDOWS®, UNIX®, LINUX® and MAC OS®.

In this embodiment, the initiator 105a is iSCSI-enabled and includes a SCSI component, such as a SCSI host adapter 155, and an iSCSI host adapter 166. The iSCSI host adapter 166 encapsulates SCSI commands in TCP/IP packets for routing over the IP network 130. Interconnection to the IP network 130 is provided through a network interface, such as a network interface card (NIC) 170.

In addition, the initiator 105a includes a virtualization client 160 coupled between the SCSI host adapter 155 and the iSCSI host adapter 166. The initiator 105a also includes memory 165 accessible by the virtualization client 160. The memory 165 stores SAN configuration information used by the virtualization client 160 to access the target storage devices 112 (FIG. 2) over the IP network 130.

Figure 4:
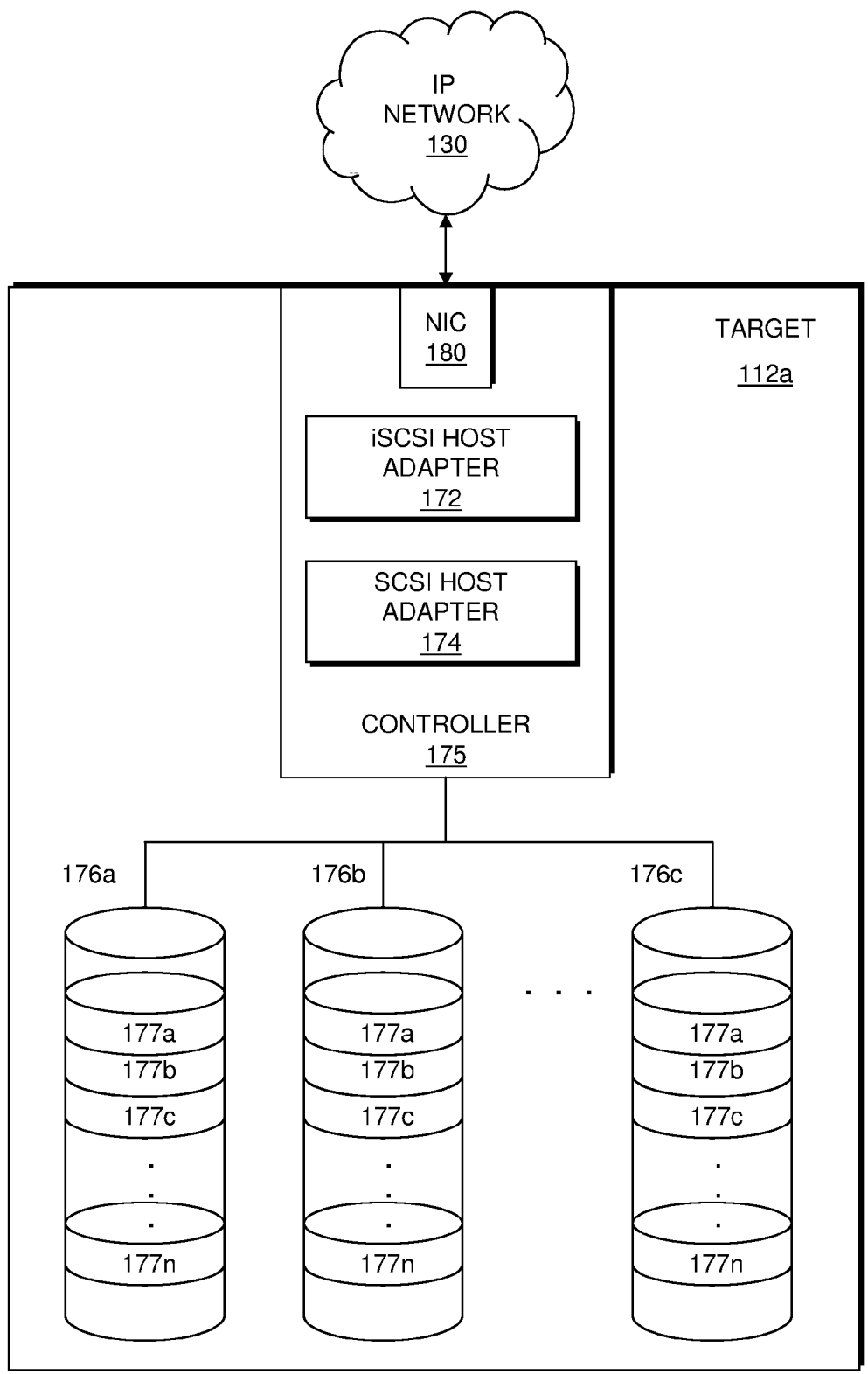
FIG. 4 is a more-detailed functional block diagram of one of the target storage devices of FIG. 2.

FIG. 4 shows an exemplary embodiment of a representative one of the target storage devices 112a. The target storage device 112a includes a NIC 180 for coupling the target storage device 112a to the IP network 130 and a controller 175 for managing access to one or more storage elements 176a, 176b, 176c (generally 176). The storage elements 176 are addressable using the SCSI protocol through an assigned Logical Unit Number (LUN). Each of the storage elements 176 can be further subdivided into one or more logical volumes 177a, 177b, 177c, . . . 177n (generally 177), within which data can be stored and later retrieved by the application 150 running on one of the initiators 105.

The target storage device 112a also includes a target controller 175 managing access to the storage elements 176 and to the logical volumes 177 defined thereon. Coupled between the NIC 180 and the storage elements 176, the target controller 175 includes an iSCSI adapter 172 and a SCSI host adapter 174. Although shown to be included in the controller 175, these adapters 172, 174 can reside separately.

Figure 5:
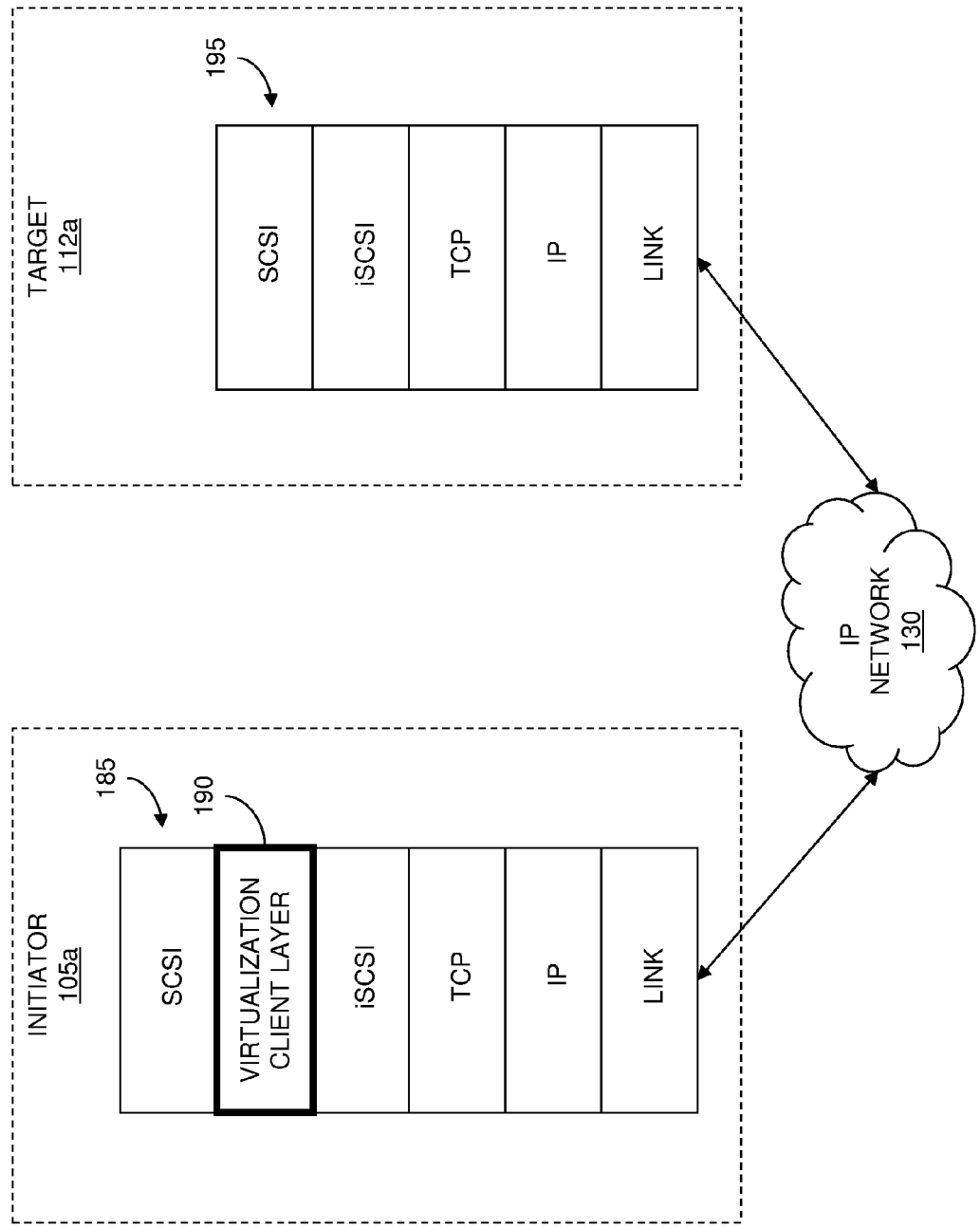
FIG. 5 is a schematic diagram illustrating one embodiment of the protocol stack arrangements of the initiators and the targets of FIG. 2.

FIG. 5 illustrates one embodiment of a protocol stack arrangement of the exemplary initiator 105a and of the exemplary target storage device 112a. From top to bottom, an initiator protocol stack 185 includes a SCSI layer, a virtualization client 190, an iSCSI layer, a TCP layer, IP layer, and a link layer.

An application 150 executing on the initiator 105a issues storage access commands defined by the SCSI protocol. The SCSI layer receives and interprets such commands. The virtualization client layer 190 between the SCSI and iSCSI layers interprets between the physical storage of the target storage device and virtualized storage as configured by the SAN administrator. The iSCSI layer encapsulates SCSI commands from the target storage device (e.g., a reply to a read command) for further processing by the TCP and IP layers. The link layer processes the TCP/IP packets for transport across the IP network 130.

A target protocol stack 195 includes substantially the same protocol layers as the initiator protocol stack 185, without the virtualization client 190. From bottom to top, the stack 195 processes the iSCSI messages received by the target storage device 112. The link, IP, and TCP layers extract the iSCSI command directed to the target storage device 112. The iSCSI layer extracts and reassembles the original SCSI command, and the SCSI command passes for interpretation to the SCSI layer.

During operation of the SAN 125, an administrator works through the virtualization controller 135 to establish a configuration for the SAN 125. For example, the administrator can configure the SAN 125 to present two physical targets (e.g., target A and target B) as a single virtual target. The virtualization controller 135 maintains the configuration, including a mapping of virtual targets to physical targets in the SAN 125, and other information regarding those physical targets.

The virtualization controller 135 shares the mapping and the physical target information with the virtualization client 160 residing on each of the initiators 105. The mapping shared by the virtualization controller 135 with each virtualization client 160 can be initiator specific. For example, the administrator may want to limit access by a given initiator 105 to certain physical storage resources (e.g., physical target A, but not physical target B). Accordingly, the initiator-specific mapping and target information that the virtualization controller 135 shares with the virtualization client 160 of this given initiator 105 ensure this access restriction. In effect, the virtualization client 160, in general, and the virtualization client layer 190, in particular, acts as a filter with respect to the physical targets with which the initiator 105 can communicate.

In addition, the iSCSI layer passes virtual target information to the SCSI layer through the virtualization client layer 190. Passing virtual target information to the SCSI layer isolates the initiator 105 from directly accessing physical storage resources. Virtualization thus provides a seamless capability for storage re-configuration because the SCSI layer does not communicate directly with the physical storage resources. That is, an administrator can add and remove physical storage resources from the SAN 125 without affecting the behavior of the SCSI layer because write commands from the SCSI layer are directed to virtual targets. The virtualization client layer 190 maps the virtual target to a particular physical target, and the iSCSI layer issues the write commands to that physical target (in this embodiment in which the virtualization controller 135 is not involved).

In some embodiments, communications between the virtualization controller 135 and the virtualization clients 160 of the initiators 105 occur in accordance with a virtualization protocol. This virtualization protocol facilitates the distribution of virtual target-to-physical target mappings (i.e., routing information) and related target information from the virtualization controller 135 to the virtualization clients 160 of the initiators 105. The virtualization protocol can also include commands to initiate re-discovery of the physical and/or virtual targets.

Figure 6:
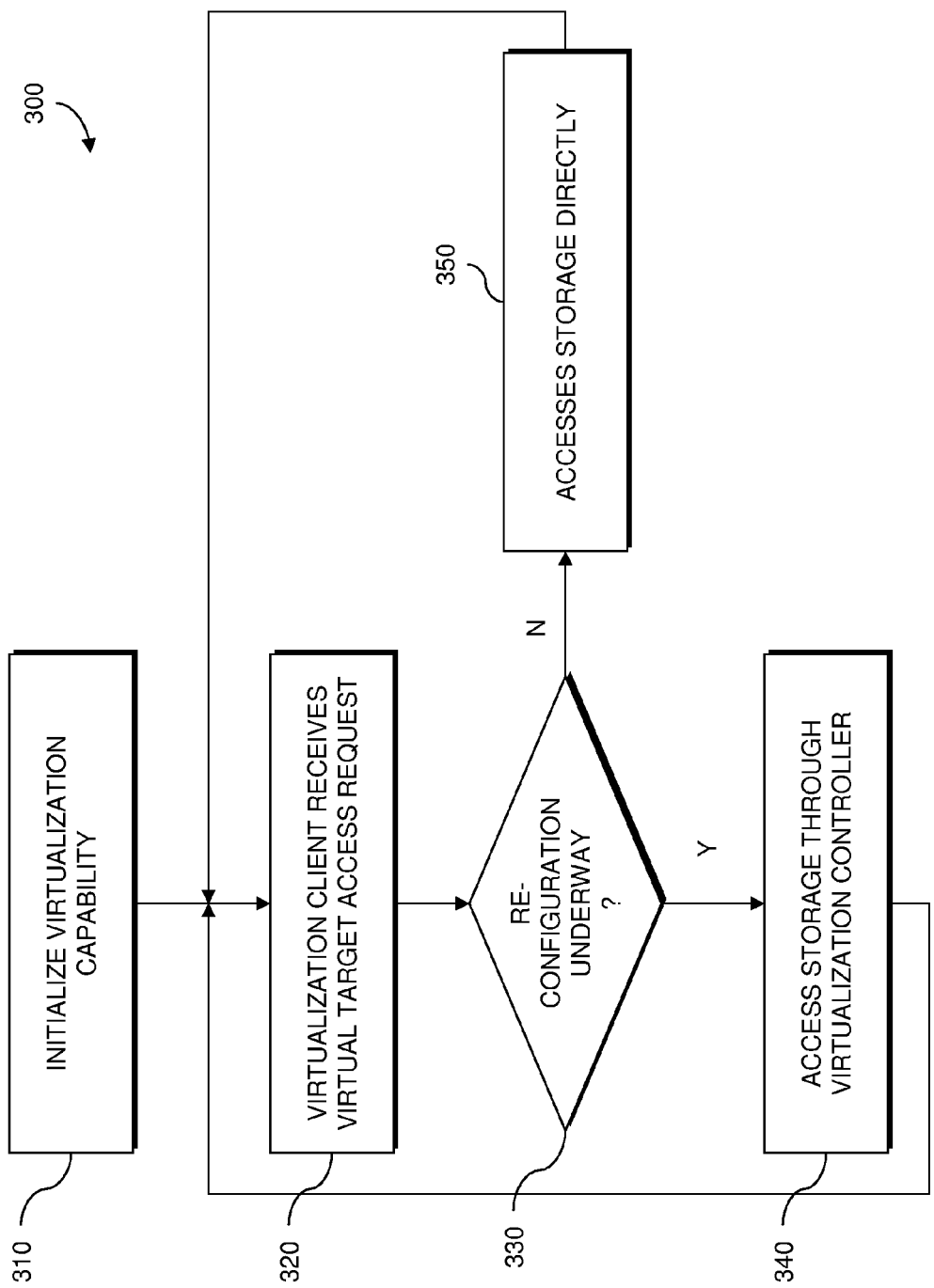
FIG. 6 is a flow diagram illustrating a process of accessing storage in accordance with the principles of the invention.

FIG. 6 shows an embodiment of a process 300 for accessing virtualized storage in accordance with the principles of the invention. At step 310, initialization of distributed virtualization occurs. In general, this initialization prepares the initiators 105 and virtualization controller 135 for communicating with targets. This initialization entails discovering initiators and targets in the SAN, gathering physical target information, defining virtual targets, mapping virtual targets to physical targets, and sharing the physical and virtual target information with the initiators. Such initialization actions can occur periodically (e.g., at regular intervals, when a target or initiator joins or leaves the SAN).

After initialization, the virtualization client 160 of the initiator 105 receives (step 320) a target access request. (The target access request is addressed to a virtual target, because virtual targets, not physical targets, are exposed to initiators at the SCSI layer). An application 150 or operating system running on the initiator 105 can issue the virtual target access request.

The virtualization client layer 190 maps the virtual target in the request to a physical target. Before it forwards the virtual target access request to the iSCSI layer, the virtualization client layer 190 determines (step 330) whether the target storage device 112 is undergoing a reconfiguration (e.g., a data migration, a snapshot, a backup). If the target storage device 112 is undergoing a reconfiguration, access to the target storage device 112 passes through (step 340) the virtualization controller 135. Otherwise, the initiator accesses (step 350) the target storage device 112 directly. Routing virtual target access requests directly to the target storage device 112, without passing them through the virtualization controller 135, avoids the bottleneck encountered by the prior art solution described in FIG. 1.

Accordingly, the virtualization client layer 190 of the initiator 105 generally routes virtual target access requests directly to the target storage device 112, unless the target storage device 112 is currently involved in a storage operation that could be adversely affected by the target access request. During such a storage operation, direct access to the target storage device 112 may result in data loss or corruption. To avoid such unwanted results during such instances, the virtualization client layer 190 routes the virtual target access requests to the virtualization controller 135. The virtualization controller 135 manages communication with the target storage device 112 during the storage operation in such a manner as to maintain the integrity of the data (i.e., of the data being written to and already resident at the target storage device 112). Storage target accesses routed through the virtualization controller 135 can be referred to as a "slow path" operation.

Figure 7:
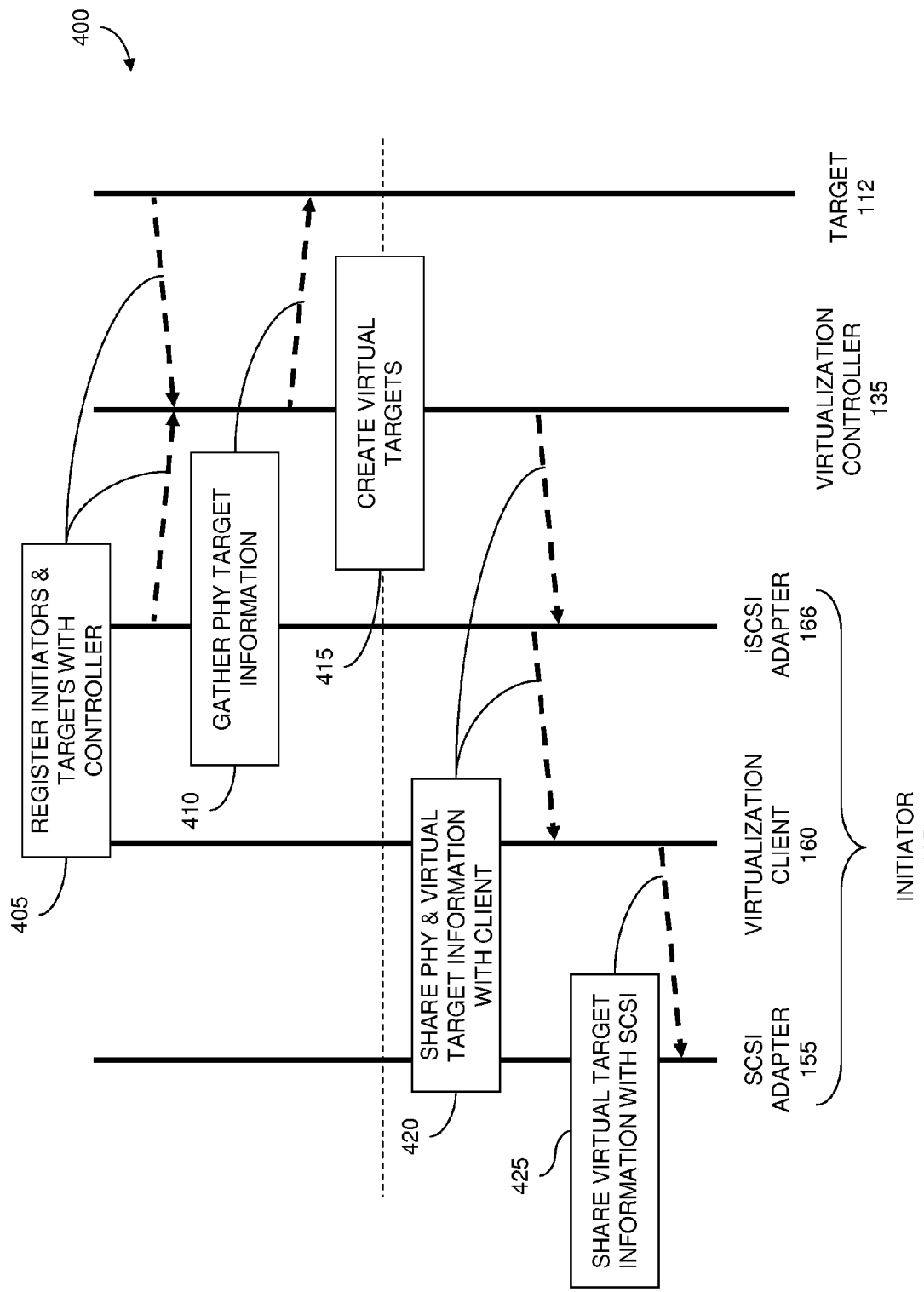
FIG. 7 is a flow diagram illustrating one embodiment of an initialization process.

FIG. 7 shows an embodiment of an initialization process 400. The bold vertical lines represent a physical target or a module within the initiator 105, as described above in connection with FIG. 2 and FIG. 3. The dashed arrows represent the flow of information between these different modules and the target. The steps are temporally ordered top-to-bottom.

At step 405, one or more initiators 105 and one or more target storage devices 112 register with the virtualization controller 135. The iSCSI host adapter 166 within each initiator 105 and the iSCSI adapter 172 (FIG. 4) within the target storage device 112 forward their registration information to the virtualization controller 135. Thus, the virtualization controller 135 discovers what devices 105, 112 are available on the network 130. Registration can also occur whenever a new device 105, 112 is coupled to the network or when an existing device 105, 112 is re-initialized.

In another embodiment, the virtualization controller 135 can discover the initiators and targets that are available on the network 130 using the iSNS server 145 (FIG. 2). The initiators 105 and targets 112 pre-register with the iSNS server 145 in accordance with the iSNS protocol. In some embodiments, the initiators 105 and target storage devices 112 have built-in iSNS clients to facilitate pre-registration with the iSNS server 145. The virtualization controller 135 can query the iSNS server 145 to obtain the list of registered devices. Consequently, the virtualization controller 135 does not have to discover the initiators 105 and targets 112 individually, or require the initiators 105 and targets 112 to register with the virtualization controller 135.

After the virtualization controller 135 discovers the available target storage devices 112, the virtualization controller 135 gathers (step 410) detailed information regarding the physical configuration of the individual target storage devices 112. For example, the virtualization controller 135 can log into each of the discovered target storage devices 112 to gather the target-related information (e.g., the number of disks and logical units (LUNs), the type of LUNs, etc.). The information obtained in this manner by the virtual controller 135 generally includes information that would be gathered by a typical SCSI initiator 105. This information can be stored locally at the virtualization controller 135 for use in creating the virtual targets.

When an initiator 105 logs into a target 112, it can issue an inquiry command to find out more information about the target 112. The target 112 returns an inquiry page that can include reserved vendor-specific fields. These fields can be used to provide mapping information of the physical targets to the client. In some embodiments, the inquiry command is sent to the physical targets 112 and the virtualization controller 135 concurrently.

An initiator 105 issues inquiry commands to the physical targets 112 and the virtualization controller 135. The virtualization controller 135 provides routing information for virtual LUNs to point in direction of physical LUNs 176. The virtualization client 160 of the initiator 105 takes the information and passes on that inquiry data necessary for the SCSI layer to manage the virtual LUN. The virtualization client 160 strips off the virtualization routing information. (In this manner, the virtualization controller 135 acts like a target 112 by returning a page.) By providing this information to the initiators 105, the virtualization controller 135 is able to participate in "slow path" communications—receiving communications from the initiator 105. Thus, the virtualization controller 135 has dual personality: (i) as a target to initiators 105; and (ii) as an initiator to the physical storage targets 112.

In some embodiments, the virtualization controller 135 can be clustered for high availability and metadata can be saved and protected. For example, the metadata can be mirrored to another remote storage platform. In one example, a CLARiiON® system commercially available from EMC Corporation of Hopkinton, Mass. can be used as a base for the virtualization controller 135.

An administrator through the access terminal 140 (FIG. 2) reviews the physical device information obtained by the virtualization controller 135 and creates (step 415) one or more virtual targets by selectively mapping the logical volumes 177 and physical storage elements 176 of the target storage devices 112 to the newly created virtual targets. A virtual target can include one or more logical volumes 177 from one or more of the storage elements 176 on one or more of the target storage devices 112.

As used herein, the term virtualization refers to having access to one or more storage devices that are presented to the host or initiator as one consolidated storage location. Thus, one virtual target addressable as a single virtual storage element can include physical storage on different target storage devices 112. For example, a 10-terabyte storage element 176 on a first target storage device 112*a* can be combined with another 10-terabyte storage element 176 on a second target storage device 112*b*. An application 150 on the initiator 105 sees a single virtual target having 20 terabytes of storage capacity. For the initiator 105, the storage capacity is abstract—the actual physical storage is hidden from the initiator 105. This capability facilitates administrative management of storage resources.

The virtual target information, together with the physical description of the target storage devices 112, is shared (step 420) with the virtualization client 160 of each of the initiators 105. In one embodiment, the virtual target and physical information shared with each initiator 105 is initiator-specific. The virtualization controller 135 determines which virtual target and physical information to send to each initiator 105.

The virtualization client 160 shares (step 425) the virtual target information but not the physical target information with the SCSI host adapter 155. Thus, the SCSI protocol commands are addressed to the virtual targets without insight into their physical composition. The virtualization client 160 performs target translations, having both the virtual target mapping and the physical target information, to route target requests between virtual targets and physical storage devices.

FIG. 8A shows an embodiment of a direct write process 430 for writing directly to a storage target (T1). The application 150 running on the initiator 105 can issues a write request. In response to the write request, the SCSI host adapter 155 of the initiator 105 generates (step 435) a SCSI write command directed to one of the defined virtual targets. The virtualization client 160 maps (step 440) the virtual target identified in the SCSI write command to the appropriate physical storage target (T1) and redirects the SCSI write command to this storage target (T1).

The iSCSI host adapter 166 receives encapsulates (step 445) the translated write command into one or more TCP/IP packets directed to the appropriate storage target (T1). The storage target (T1) receiving the iSCSI commands unpacks the information and performs the requested write to the appropriate physical storage. As illustrated by this example, the iSCSI-enabled initiator 105 writes directly to the physical storage target (T1), i.e., without having to route the write command through a virtualization appliance.

FIG. 8B shows an embodiment of a slow-path write process 450 for writing to a storage target (T1) during a data move operation. During a data move target, all data from one target storage device 112a are written to another target storage device 112b. The virtualization controller 135 or other host may initiate the data move operation. An upgrade or replacement of the target storage device 112a may provide the need for data move operation.

For example, consider a situation in which a SAN administrator is replacing a target storage device 112a with a SYMMETRIX® system (as target storage device 112b), commercially available from EMC Corporation of Hopkinton, Mass. After installation of the SYMMETRIX® target 112b and connection to the IP network 130, the virtualization controller 135 sends to one or more initiators 105 a mapping that includes the new target 112b. The transfer of data stored on the target 112a to the target 112b should occur without incurring downtime, preferably as a background process that does not interfere with ongoing I/O operations. That is, if an initiator 105 writes to the target 112a while the data move operation is in progress, the initiator does not write directly to the target 112a in order to avoid corrupting the results of the data move operation.

Before any of the data is moved from the target storage device 112a to the target storage device 112b, the virtualization controller 135 informs the initiators 105 that the data move operation is about to commence. For example, the virtualization controller 135 sends (step 455) a notification to registered initiators 105. In response, the initiators 105 store an indicator that a data move operation involving the target storage devices 112a, 112b is in progress.

The virtualization controller 135 participates in the data move operation by reading (step 460) data from the first target storage device 112a and writing (step 465) that data to the second target storage device 112b. The virtualization controller 135 generally retains a status indicator, e.g., a bit map, to track the progress of the data transfer.

When an application 150, for example, issues (step 470) a write command to a virtual target, the virtualization client 160 determines the corresponding physical target and whether that physical target is involved in a data move operation. If the physical target is engaged in a data move operation, the virtualization client 160 redirects (step 475) the write command to the virtualization controller 135 and forwards the write command to the iSCSI host adapter 166. The iSCSI host adapter 166 directs (step 480) the iSCSI write command to the virtualization controller 135.

To ensure that write command does not interfere with the integrity of the data move operation, the virtualization controller 135 sends (step 485) the write command to the first target storage device 112a and to the second target storage device 112b. Again, the virtualization controller 135 can set a bitmap to track the written data.

Any subsequent write commands issued by the initiator 105 during the data move operation are handled similarly. Upon completion of the move, the virtualization controller 135 issues (step 490) a command to the registered initiators 105 informing them that the data move operation involving target storage devices 112a, 112b is complete. The initiators 105 accordingly update their respective stored indicators to reflect the change in status.

The virtualization controller 135 can also notify (step 490) registered initiators of the change in physical configuration of the target storage devices (i.e., the addition of the target storage device 112b and removal of the target storage device 112a). The virtualization controller 135 may redefine virtual targets previously mapped to the target storage device 112a, and share any redefined virtual targets and the physical and virtual target information with the initiators 105.

FIG. 8C shows an embodiment of a direct write process 500 after completion of the data move operation of FIG. 8B, during which data stored at the first target storage device 112a moved to the second target storage device 112b. The post-move write is similar to the write process of FIG. 8A in one respect, that the SCSI adapter 155 of the initiator 105 can send (step 505) a write command to the same virtual target as before the data move operation. That is, to the application 150 running on the initiator 105, and to the SCSI adapter 155, the data move operation occurred transparently: the data move operation did not affect the operation of the application 150 or of the SCSI adapter 155. The virtualization client 160, on the other hand, receives a new mapping from the virtualization controller 135 that reflects the physical configuration change resulting from the data move operation. Accordingly, the virtualization client 160 maps (step 510) the virtual target identified in the SCSI write command to the new appropriate physical storage target 112b and redirects the SCSI write command to this storage target 112b. The iSCSI adapter issues (step 515) to the new target storage device 112b directly (i.e., without passing the command through the virtualization controller 135).

Figure 9:
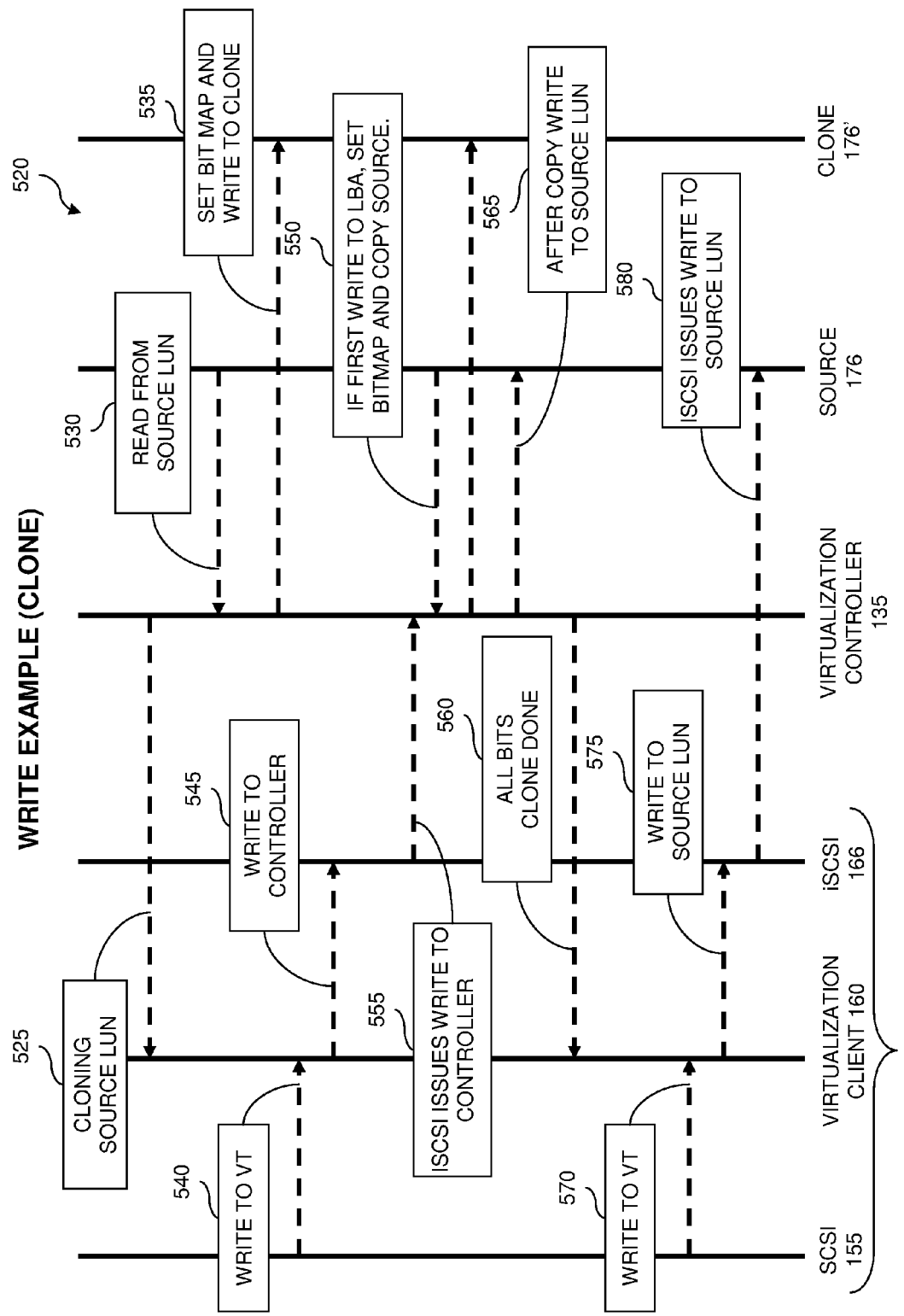
FIG. 9 is a flow diagram illustrating one embodiment of a process for writing to a virtual target during a cloning process.

FIG. 9 shows an embodiment of a process 520 for writing to a storage target while generating a point-in-time copy of that storage target, also referred to as cloning. In a cloning process, data are copied from a first target storage device 112a to a second target storage device 112b. Unlike the data move operation described above in connection with FIGS. 8A-8C, the first target storage device 112a remains in operation after the cloning process completes.

The virtualization controller 135 notifies (step 525) the virtualization client 160 of registered initiators 105 that one of the storage elements 176 of the target storage device 112a is undergoing cloning. The virtualization controller 135 reads (step 530) data from the first storage element 176 (i.e., a source LUN) and copies (step 535) that data to the second storage element 176' (i.e., the clone). The virtualization controller 135 can also set a bit map to track the progress of the cloning operation. For example, data stored at logical block addresses 1 to 100 can be cloned, using a bitmap for tracking progress of the cloning process per logical block address. Once all of the logical block addresses (i.e., 1-100) have been copied, the cloning process is complete.

At step 540, the SCSI adapter 155 of one of the initiators 105 forwards a write command to the virtualization client 160. The virtualization client 160 determines that the virtual target to which the write command is directed maps to the physical target 112a, which in this instance is involved in the cloning process. The virtualization client 160 redirects (step 545) the write command from the source LUN 176 to the virtualization controller 135. The iSCSI adapter 166 issues (step 555) the redirected write command to the virtualization controller 135 over the network. Write commands are redirected to the virtualization controller 135 during a cloning process to ensure that write commands are not handled improperly. Namely, write commands received during the cloning process (after the point-in-time of the copy), must not be inadvertently cloned.

At step 550, the virtualization controller 135 determines whether this write is the first write to an associated logical block address that has not already been cloned. If so, the virtualization controller 135, before servicing the write, sets the bitmap and writes (step 565) a copy of the content associated with the targeted logical block address to the clone 176'. Thus, the targeted logical block address is cloned out of order, before servicing the write. After the logical block address targeted by the write has been cloned, the write is directed to the source LUN 176. It is not necessary to track subsequent writes to the same logical block address, since once the logical block address has already been cloned, subsequent writes to the same logical block address can safely be forwarded to the source LUN 176.

After the cloning process complete, the virtualization controller 135 notifies (step 560) the virtualization client 160. When the virtualization client 160 subsequently receives (step 570) writes directed to the same virtual target, the virtualization client 160 redirects the write commands to the source LUN 176 and forwards (step 575) the write commands to the iSCSI adapter 166. The iSCSI adapter sends (step 580) the write commands directly to the source LUN 176, without routing through the virtualization controller 135.

FIG. 10 is a representation of one embodiment of an inquiry data page used to distribute storage target information to the initiators and to the virtualization controller 135. The inquiry data pages provide the virtualization controller 135 with information for mapping the virtual targets to the physical storage devices. In addition, the virtualization controller 135 can send inquiry pages to the initiators with mapping information embedded in the vendor-specific fields of the inquiry page. These inquiry pages provide an alternative to using the above-described virtualization protocol for distributing mappings (routes) to initiators 105.

While the present invention has been shown and described herein with reference to specific embodiments thereof, it should be understood by those skilled in the art that variations, alterations, changes in form and detail, and equivalents may be made or conceived of without departing from the spirit and scope of the invention. For example, the principles of the invention have herein been described primarily with reference to iSCSI initiators and iSCSI targets, and IP networks. It is to be understood that the general principles of distributed virtualization can be extended to other types of devices and networks, e.g., Fibre Channel initiators and Fibre Channel targets coupled to a Fibre Channel switch fabric. Accordingly, the scope of the present invention should be assessed as that of the appended claims and by equivalents thereto.

What is claimed is:

1. A storage system providing networked access to a plurality of storage devices, the storage system comprising:
    a virtualization controller coupled to a network, the virtualization controller producing a mapping of a virtual target to one or more physical storage devices on the network; and
    an initiator in communication with the virtualization controller over the network to receive the mapping from the virtualization controller, the initiator including a virtualization client for translating, in accordance with the mapping, a target access request directed to the virtual target by the initiator into a target access request directed to one of the physical storage devices in accordance with the mapping.

2. The storage system of claim 1, wherein the virtualization client maintains an indicator that determines whether to route the target access request to the virtualization controller instead of to one of the physical storage devices.

3. The storage system of claim 1, wherein the virtual target includes a plurality of separate physical storage devices.

4. The storage system of claim 1, wherein the mapping is specific to the initiator and can limit access by the initiator to the physical storage devices.

5. The storage system of claim 1, wherein the initiator and the plurality of physical storage devices are iSCSI-enabled devices.

6. The storage system of claim 1, wherein the network is a packet-switched network.

7. The storage system of claim 1, further comprising an access terminal coupled to the virtualization controller, through which an administrator defines the mapping of the virtual target to at least one of the plurality of storage devices.

8. The storage system of claim 1, further comprising a storage name server coupled to the network storing registration information indicative of the initiator and the plurality of storage devices, the virtualization controller accessing the stored registration information over the network to discover the initiator and storage devices.

9. The storage system of claim 1, wherein the initiator further comprises a SCSI host adapter for receiving a target access request directed to the virtual target and producing an SCSI command based on the target access request, and a network interface module, coupled to the network, for sending the SCSI command directly to a target determined by the virtualization client.

10. The storage system of claim 9, further comprising an iSCSI adapter disposed between the SCSI adapter and the network interface module, the iSCSI adapter encapsulating the SCSI transaction within a TCP/IP protocol for transport through the network.

11. The storage system of claim 1, further comprising a second initiator coupled to the network, and wherein the virtualization controller produces a second different mapping of virtual targets to the plurality of storage devices and sends the second mapping to the second initiator over the network.

12. A method for accessing a plurality of target storage devices over a network, the method comprising:
    discovering by a virtualization controller at least one initiator and a plurality of target storage devices coupled to the network;
    mapping a virtual target to at least one of the discovered plurality of target storage devices; and
    forwarding, by the virtualization controller, the mapping over the network to at least one discovered initiator.

13. The method of claim 12, wherein the at least one discovered initiator and the plurality of target storage devices are iSCSI-enabled devices.

14. The method of claim 12, wherein the step of discovering the at least one initiator and the plurality of target storage devices includes registering each initiator and each target storage device with the virtualization controller.

15. The method of claim 12, wherein the step of discovering the at least one initiator and the plurality of target storage devices includes querying a storage name server coupled to the network for registration information provided by the at least one initiator and the plurality of target storage devices.

16. The method of claim 12, further comprising:
    reconfiguring one of the target storage devices of the plurality of target storage devices; and
    routing, by the at least one discovered initiator, a target access request to one of the plurality of target storage devices through the virtualization controller during the reconfiguration.

17. The method of claim 16, further comprising sending a notification to the at least one discovered initiator that the one target storage device of the plurality of target storage devices is undergoing reconfiguration.

18. The method of claim 16, wherein the step of reconfiguring includes cloning at least one target storage device of the plurality of target storage devices.

19. The method of claim 16, wherein the step of reconfiguring includes moving stored data from one of the plurality of target storage devices to another one of the plurality of target storage devices.

20. A storage system providing networked access to a plurality of storage devices, comprising:

means for discovering by a virtualization controller at least one iSCSI initiator and a plurality of iSCSI target storage devices coupled to an Internet Protocol (IP) network;

means for mapping at the virtualization controller at least one of the plurality of iSCSI target storage devices to a virtual target; and means for forwarding the mapping to at least one iSCSI initiator coupled to the network.

* * * * *